United States Patent [19]

Kutz et al.

[11] Patent Number: 5,484,668
[45] Date of Patent: Jan. 16, 1996

[54] UNIVERSALLY ADAPTABLE BATTERY CHARGER CONNECTOR AND METHOD OF USING SAME

[75] Inventors: Donald A. Kutz, Del Mar; Philip J. DeSantis, San Diego, both of Calif.

[73] Assignee: H.M. Electronics, Inc., San Diego, Calif.

[21] Appl. No.: 919,880

[22] Filed: Jul. 27, 1992

[51] Int. Cl.$^6$ .......................... H01M 2/30; H01M 10/44; H01R 11/18
[52] U.S. Cl. ................................ 291/121; 429/50; 320/2; 439/506
[58] Field of Search ...................... 429/121, 50; 320/2; 439/506

[56] References Cited

U.S. PATENT DOCUMENTS 4,781,629  11/1988  Mize ........................................ 439/822

Primary Examiner—C. Warren Ivy
Assistant Examiner—D. Margaret M. Mach
Attorney, Agent, or Firm—Bernard L. Kleinke; Jerry R. Potts

[57] ABSTRACT

A universally adaptable battery charger connector which couples electrically a battery charger outlet to pairs of terminals of different types and kinds of rechargeable battery devices. The universal adaptable battery charger includes an attachment arrangement for engaging releasably one of the pairs of battery device terminals. The attachment arrangement includes a pair of electrodes coupled electrically to a battery charger outlet for helping to supply electrical current to the battery device terminals. The universal connector also includes a securing device for mounting removably on the battery device to be charged. Each one of the electrodes includes a resilient contact for pressing resiliently into engagement with the terminals to maintain an electrical and mechanical contact between the securing device and the battery device terminals. Thus, the electrodes can be positioned in engagement with the terminals independent of the size and shape of the battery device as well as of the configuration of the terminals.

18 Claims, 4 Drawing Sheets

UNIVERSALLY ADAPTABLE BATTERY CHARGER CONNECTOR AND METHOD OF USING SAME

TECHNICAL FIELD

This invention relates in general to an electrical connector and method of using same, and it more particularly relates to a universally adaptable battery charger connector and method for coupling electrically a battery charger outlet to pairs of terminals of different types and kinds of rechargeable battery devices.

BACKGROUND ART

Modernly, portable electronic devices have become quite popular. Such portable devices have been made possible by the use of batteries which provide a convenient source of readily available electrical power.

While such power sources are convenient, the cost of replacing worn out batteries can be quite expensive. Therefore, in order to overcome the cost of replacing such batteries, modern portable electronic equipment employs rechargeable battery devices, such as batteries or battery packs. In this regard, through the use of a battery charger, a rechargeable battery or battery pack may be recharged repeatedly for the continued use of the equipment powered thereby.

In this regard, there are well over 100 different types and kinds of rechargeable battery packs in common use today. They include battery packs for a variety of different applications, including laptop computers, two-way communication devices and others.

The wide variety of different types and kinds of power sources has created a problem in that the user must purchase a different battery charger for each different battery device to be recharged. In this regard, there are a variety of different manufacturers of the same kind of battery device. Moreover, the same manufacturer may produce different models of a particular items, thus, producing variances between the particular type and kind of battery packs and batteries. For example, there are many different categories of rechargeable battery devices, including battery packs, cylindrical batteries, lantern batteries, dry cell batteries and wet cell batteries.

Such different configuration of batteries as well as the dimensional differences in various battery devices relative to their height, width, length, and placement of electrodes results in wide variations between such types and kinds of devices.

In an attempt to accommodate different types and kinds of battery devices, battery chargers individually sized battery device receiving holding units have been employed. In this regard, each such individually dimensioned holding unit or receptacle is molded of thermoplastic to accommodate only one given type of battery pack or battery. Thus, the variations in battery device dimensions and terminals locations necessitates making a new mold each time a new rechargeable battery device comes on the market. In this manner, a user can use only a single battery charger employing a group of different receiving units or receptacles for the same battery charger. However, the battery charger manufacturer does have considerable expenses for making the mold. Also, there are, of course, unwanted time delays in having the mold made, and thus the new receiving units are not made available to the public immediately.

Also, the battery charger manufacturers incur additional expenses in supplying the receiving units to the public. In this regard, there is added production costs, research and development costs, packaging costs, and administrative costs. Also, to accommodate the various types and kinds of receiving units in the prior known universally adaptable battery chargers, there is necessitated significant inventory costs. Furthermore, the owners of the prior known battery chargers must be made known of the new receiving units, as they become available. Thus, added expenses are incurred by the battery charger manufacturer.

Before each new receiving unit can be mass produced for public use, each unit must be tested thoroughly. In this regard, the new unit must hold its battery device securely in place to enable the battery device terminals or battery terminals to be connected electrically to the charging electrodes of the charger to permit proper electrical current flow to the battery.

The proliferation of such a wide variety of different battery devices also presents a problem for the consumer. Thus, to charge each of these different types and kinds of batteries and battery packs, the consumer must purchase a different battery device receiving unit for each different type and kind of battery device to be charged by the user. Thus, there is an added expense and inconvenience to the user. In addition to the expense of acquiring several different specially dimensioned units, the consumer is also inconvenienced by having to store such units.

Finally, the consumer is also inconvenienced by the time lag between the introduction of a new battery device into the marketplace, and the actual production of a new battery device receiving unit. Thus, even though the user may have purchased previously a universally adaptable battery charger, he or she may not be able to charge his or her new battery device, unless and until the battery charger manufacturer makes the new battery device receiving unit available to enable the existing battery charger to accommodate the new battery device.

Thus, it would be highly desirable to enable a single battery charger unit to recharge a large number of different types and kinds of batteries and battery packs. Such a technique should also be inexpensive to manufacture and readily adaptable to a majority, if not all, of the different types and kinds of rechargeable devices entering the marketplace.

DISCLOSURE OF INVENTION

Therefore, the principal object of the present invention is to provide a new and improved battery charger connector adaptable for enabling a single battery charger to be used for charging a wide variety of different types and kinds of rechargeable battery devices, so that, as new battery devices become available to the public, such new devices can be accommodated immediately by the battery charger without the need for purchasing special new adapters.

It is another object of the present invention to provide such a new and improved battery charger connector for a single or a plurality of battery chargers, which is easily stored, and which is relatively inexpensive to manufacture.

Briefly, the above and further objects of the present invention are realized by a universally adaptable battery charger connector which couples electrically a battery charger outlet to pairs of terminals of different types and kinds of rechargeable battery devices. The universal adaptable battery charger includes an attachment arrangement for engaging releasably one of the pairs of battery device terminals. The attachment arrangement includes a pair of electrodes coupled electrically to a battery charger outlet for helping to supply electrical current to the battery device terminals. The universal connector also includes a securing device for mounting removably onto the battery device to be charged. Each one of the electrodes includes a resilient contact for pressing resiliently into engagement with the terminals to maintain a firm electrical and mechanical contact between the securing device and the battery device terminals. Thus, the electrodes can be positioned in engagement with the terminals independent of the size and shape of the battery device as well as the configuration of the terminals.

BRIEF DESCRIPTION OF DRAWINGS

The above mentioned and other objects and features of this invention and the manner of attaining them will become apparent, and the invention itself will be best understood by reference to the following description of the embodiments of the invention in conjunction with the accompanying drawings, wherein.

BEST MODE FOR CARRYING OUT THE INVENTION

Figure 1:
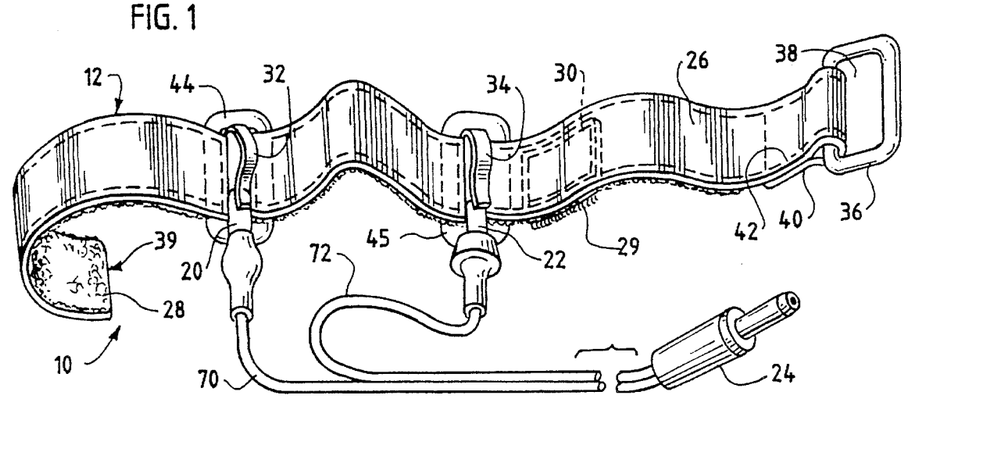
FIG. 1 is a pictorial view of a universally adaptable battery charger connector, which is constructed in accordance with the present invention.
Figure 2:
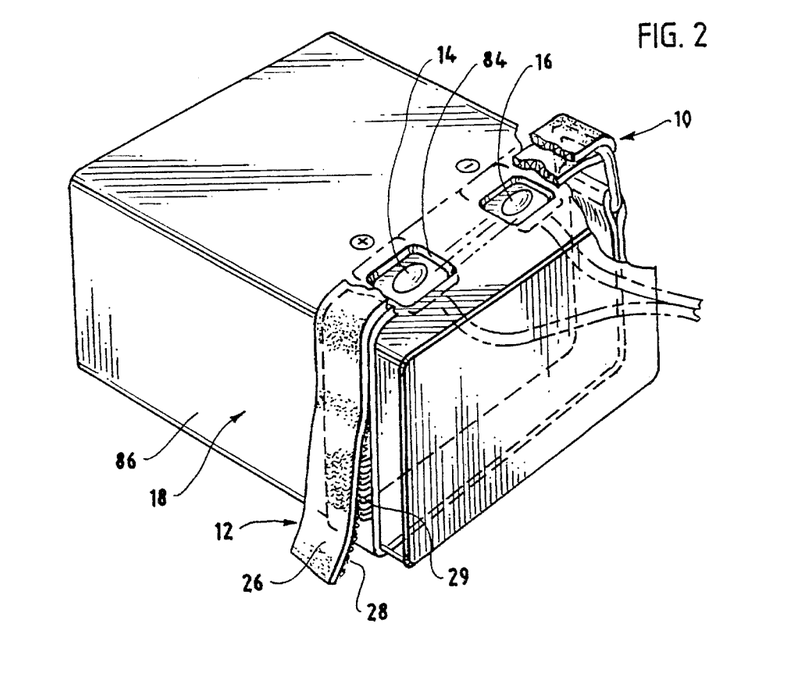
FIG. 2 is a pictorial view of a rechargeable battery device having the battery charger connector illustrated in FIG. 1 attached thereto for charging purposes.

Referring now to the drawings and more particularly to FIGS. 1 and 2 thereof, there is shown a universally adaptable battery charger connector 10, which is constructed in accordance with the present invention. The connector 10 can be readily and conveniently used for coupling electrically a battery charger outlet (not shown) to pairs of terminals 14 and 16 of a battery pack 18 to enable it to be charged. The connector 10 enables the same battery charger to charge a wide variety of different types and kinds of rechargeable battery devices, such as rechargeable batteries and battery packs.

While the preferred embodiment of the present invention discloses a single strap with a pair of electrodes, it is to be understood that two, or more electrodes can be disposed on a single strap for those battery terminal devices with more than two battery terminals. It will also be understood that a plurality of straps, each with a single electrode can be utilized to accommodate battery terminal devices with two or more terminals. Thus, more than a pair of attachment devices is possible within the true spirit and scope of the invention.

The connector 10 generally comprises an elongated attachment device indicated generally at 12 for engaging releasably the pair of terminals 14 and 16 of the rechargeable battery device 18 (FIG. 2). The attachment device 12 includes a pair of electrodes 20 and 22 which are adapted to be coupled electrically to the battery charger outlet (not shown) by a male electrical jack 24. The electrodes 20 and 22 are mounted slidably and adjustably on a strap 26 having a Velcro pile material 28 on one external surface thereof. A Velcro hook strap 29 is secured by stitching or a double sided Velcro strip, or other suitable fastening means 30 to the strap 26 on top of a portion of the Velcro pile material 28. In this regard, the strap 26 can be wrapped around the battery terminal device 18, as best seen in FIG. 2, and the Velcro pile and hooks engage one another to secure removably the strap to the battery device 18.

Although a strap is the preferred embodiment it is understood that other types of materials may be employed, such as elastic bands, rubber bands and the like.

Each one of the electrodes 20 and 22 includes a resilient contact, such as a pair of contacts 32 and 34, respectively, for pressing resiliently into engagement with the pair of respective battery device terminals 14 and 16 to complete electrical contact therewith. In this regard, the contacts 32 and 34 help maintain an electrical contact with the electrodes 20 and 22.

In order to help secure the strap 26 to the battery terminal device 18, the connector 10 also includes a buckle cinch 36 secured at one end of the strap 26. The buckle cinch 36 includes an opening 38 which is dimensioned for receiving the opposite free end 39 (FIG. 1) of the strap 26 therethrough, as indicated in FIG. 2.

In use, the connector 10 is grasped and held in the hands of a user in such a manner to enable the strap 26 to be wrapped securely about the body or housing of the battery terminal device 18. Once the strap 26 is wrapped about the exterior of the device 18, the free end 39 of the strap 26 is positioned through the opening 38 in the buckle cinch 36 and pulled a sufficient distance to prevent the strap 26 from becoming dislodged from the buckle cinch 36. The user then adjusts the position of the electrodes 20 and 24 along the strap 26 until their respective contacts 32 and 34 are disposed opposite and thus engage the terminals 14 and 16 mechanically and electrically.

After adjusting the electrodes 20 and 24, the user pulls the free end 39 of strap 26 a further sufficient distance until the buckle cinch 36 firmly engages the housing of the battery terminal device 18. The user then causes the Velcro piles 28 and hooks 29 to engage one another, thus securing the strap 26 to the device 18.

In this manner, the contacts 32 and 34 firmly engage the terminals 14 and 16 to facilitate completing an electrical charging path including the terminals 14 and 16, the electrodes 20 and 22, a pair of leads 70 and 72, the jack 24, and the outlet (not shown) of the battery charger (not shown), for supplying electrical current to the rechargeable battery device 18.

Considering now the construction of the connector 10 in greater detail, an end 40 of the strap 26 extends through the opening 38 and back onto itself, where stitching 42 secures the end 40 to the strap 26 to capture the buckle cinch 36.

In order to enable a positionally adjustable movement of the electrodes 20 and 22 relative to, and along the strap 26, the electrodes include a pair of slide plates 44 and 45. As each of the slide plates 44 and 45 are substantially similar to one another, only the slide plate 44 will now be described in greater detail.

Figure 3:
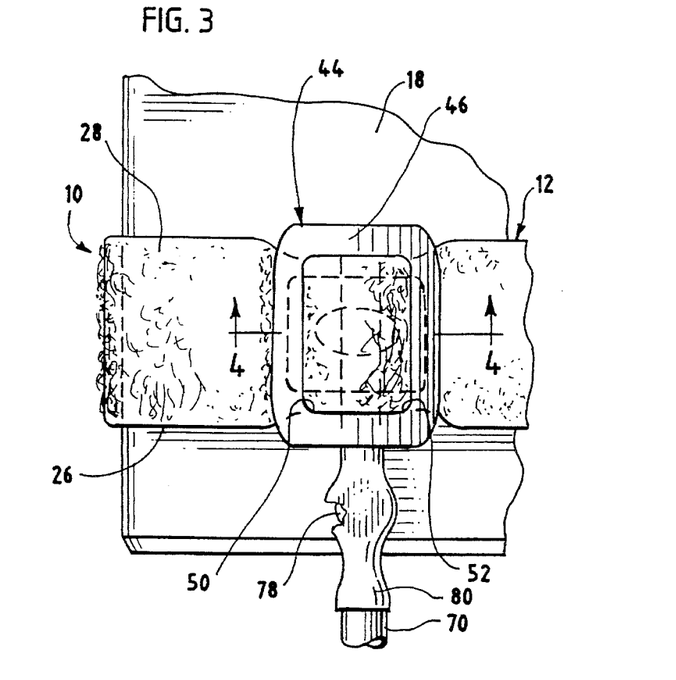
FIG. 3 is a greatly enlarged, fragmentary top plan view of the battery charger connector of FIG. 1, illustrating a slide plate electrode.

Considering now the slide plate 44 in greater detail with reference to FIGS. 1 and 3, the slide plate 44 has a unitary construction and is composed of a rigid, insulating material, such as a suitable thermoplastic material. The slide plate 44 includes a top member 46 having a centrally disposed, rectangularly shaped opening, and a flat oblong member 48 integrally connected to the underside of the top member 46. The oblong member 48 extends across the underside of the top member 46 forming a pair of openings 50 and 52 respectively. As hereinafter described in greater detail, the slide plate 44 can be moved slidably along the strap 26 by applying pressure to it and causing it to move along the strap 26. In this regard, the strap 26 is passed from the underside of the top member 46 through the opening 50, over the oblong member 48 and through the opening 52 to mount the slide plate slidably to the strap 26. Thus, the top member 46 and the oblong member 48 cooperate together to secure the strap 26 to the slide plate 44.

Figure 4:
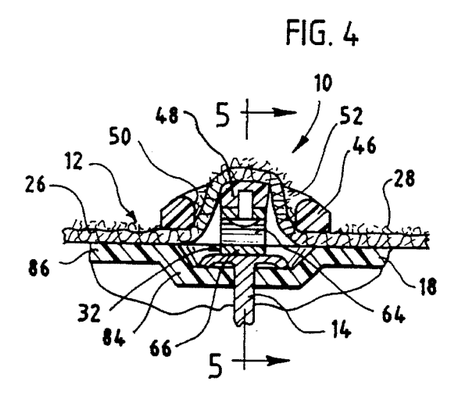
FIG. 4 is a cross sectional view of a terminal of FIG. 3, illustrating the electrode engaging the terminal of the battery terminal device to be charged.
Figure 5:
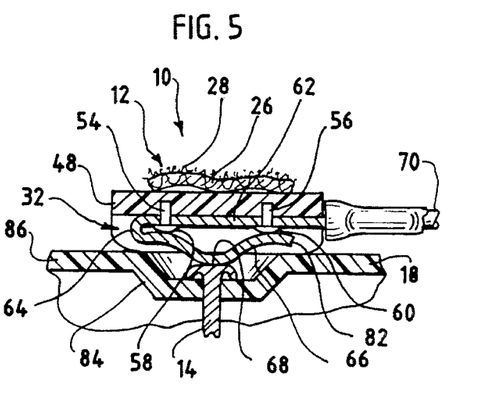
FIG. 5 is a cross sectional view of the electrode of FIG. 4 taken substantially on line 5—5 thereof.

As best seen in FIGS. 4 and 5, the oblong member 48 includes a pair of clasps or rivets, such as clasps 54 and 56 extending from its underside. The clasps 54 and 56, during assembly, are wrapped around the contact 32 to secure the contact 32 to the slide plate 44. In order to further secure the contact 32 to the slide plate 44, a bonding material, such as a solder bonding material indicated generally at 58 and 60 is applied to the clasps 54 and 56.

Considering now the contacts 32 and 34 in greater detail with reference to FIGS. 1, 3, 4 and 5, only contact 32 will be described in greater detail as both contacts 32 and 34 are substantially similar.

As best seen in FIG. 4 and 5, the contact 32 has a unitary construction and is composed of a conductive metallic material. The contact 32 includes a generally flat rectangularly shaped straight leg member 62 having its free end secured to one of a pair of conductors 70, 72 (FIG. 1) connected electrically to the jack 24. In this regard, the straight leg member 62 is secured by a conventional securing device 78 that is mounted to the conductor 70. An insulation sleeve 80 covers the device 78. The straight leg member or portion 62 is mounted to the slide plate 44 by the clasps 54 and 56 respectively as best seen in FIG. 5.

As best seen in FIG. 5, the contact 32 also includes a reversely-bent U-shaped member or portion 64 connected integrally to the opposite end of the straight member 62. A generally V-shaped member or portion 66 is integrally connected to the other end of the member 64. The V-shaped member 66 is resilient and includes an apex portion 68 which is adapted to be coupled mechanically and electrically to the terminal of the battery device 18, such as the battery terminal 14.

In order to enable the V-shaped member 66 to be resilient and movable, a free end 82 (FIG. 5) of the V-shaped member 66 enable it to move toward and away from the straight member 62. The member 66 is normally biased away from the straight member 62, but deforms or flattens until the free end 82 engages the clasp or rivet 60, as shown in FIG. 5.

As best seen in FIG. 5, the V-shaped member 66 has its height of a sufficient distance to enable the apex 68 to enter a well 84 in the battery pack housing 86, and enable the apex 68 to engage electrically the terminal 14, even with the V-shaped member fully depressed. Thus, the V-shaped member engages the terminal and is urged resiliently thereagainst.

Figure 6:
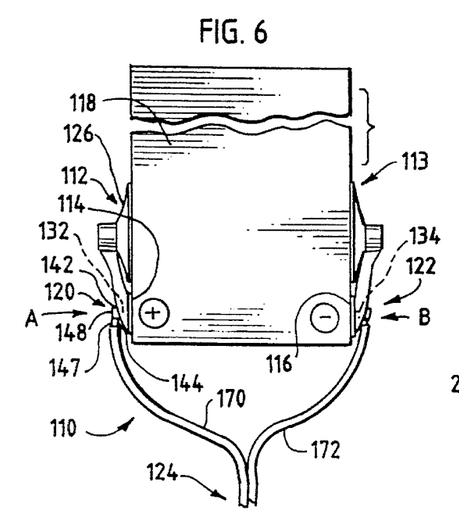
FIG. 6 is a plan view of another universal adaptable battery charger connector, which is constructed in accordance with the present invention.

Referring now to FIG. 6 of the drawings, there is shown a universally adaptable battery charger connector 110, which is adapted to be used with a battery charger (not shown). The connector 110 is similar to the connector 10 in that the connector 110 can be readily used for coupling a battery charger outlet to pairs of terminals of different types and kinds of rechargeable battery devices in accordance with the method of the present invention.

The connector 110 generally includes a pair of attachment devices 112 and 113 for engaging releasably a pair of terminals, such as a pair of terminals 114 and 116 of a rechargeable battery device 118. The attachment devices 112 and 113 include a pair of electrodes 120 and 122 respectively which are adapted to be coupled to the battery charger outlet by a male jack 124. The male jack 124 is substantially similar to jack 24.

The electrodes 120 and 122 include a resilient contact, such as a contact 132 and 134 respectively for pressing resiliently into engagement with the pair of battery device terminal 114 and 116 respectively. The contacts 132 and 134 are substantially similar to contacts 32 and 34 respectively. Contacts 132 and 134 are connected to the jack 124 by a pair of conductors 170 and 172 respectively.

As the attachment devices 112 and 113 are substantially similar only attachment device 112 will be described hereinafter in greater detail.

Referring now to FIG. 6, the attachment device 112 includes an annularly shaped suction-cup 126 adapted to be secured removably to the battery terminal device 118. The suction-cup 126 includes an opening 142 having an L-shaped connector member 144 mounted therein. The L-shaped connector member 144 includes an oblong portion 148 that includes a pair of clasps (not shown) for securing the contact 132 to the connector member 144. The connector member 144 also include a mating member 147 adapted to be mechanically and electrically coupled to the conductor 170. The contact 132 is secured to the oblong portion 148 in a similar manner as the contact 32 is connected to oblong portion 48. Similarly, the mating member 147 is connected to the conductor 170 in a similar manner as the oblong member 48 is connected to conductor 70.

In use, the connector 110 is grasped and held in the hands of the user in such a manner to enable the attachment devices 112 and 113 to be secured removably to the body of the battery terminal device 118. In this regard, the suction cup 126 is positioned so that electrode 120 engages terminal 114. The user then attaches the suction cup 126 to the device 118. After the suction cup 126 is attached to the device 118, the user presses downwardly on the top of the electrode 120 in the direction of the arrow A causing the contact 132 to engage the terminal 114. In a similar manner, device 113 is secured to the battery terminal device 118 so that electrode 122 engages the terminal 116. In this regard, the user presses downwardly on electrode 122 in the direction of arrow B.

Figure 7:
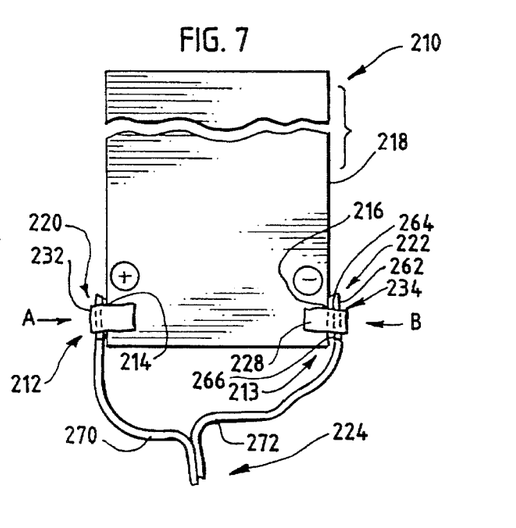
FIG. 7 is a plan view of yet another universal adaptable battery charger connector, which is constructed in accordance with the present invention.

Referring now to FIG. 7 of the drawings, there is shown a universally adaptable battery charger connector 210, which is adapted to be used with a battery charger (not shown). The connector 210 generally comprises a pair of attachment devices 212 and 213 for engaging releasably a pair of terminals, such as a pair of terminals 214 and 216 of a rechargeable battery device 218. The attachment devices include a pair of electrodes 220 and 222 respectively which are adapted to be coupled to the charger outlet by a male jack 224. The male jack 224 is substantially similar to jack 24.

The electrodes 220 and 222 include a resilient contact, such as a contact 232 and 234 respectively for pressing resiliently into engagement with the pair of battery device terminals 214 and 216 respectively. The contacts 232 and 234 are substantially similar to contacts 32 and 34 respectively. Contacts 232 and 234 are connected to jack 234 by a pair of conductors 270 and 272 respectively.

As the attachment devices 212 and 213 are substantially similar only attachment 213 will be described hereinafter in greater detail.

Referring now to FIG. 7, the attachment device 213 includes a reusable adhesive strip 228 adapted to be secured removably to the battery terminal device 218. The adhesive strip 228 is generally oblong in shape, and is secured to the contact 234 by conventional securing means (not shown).

Considering now the contact 234 in greater detail with reference to FIG. 7, the contact 234 is substantially similar to contact 34. In this regard, contact 234 includes a straight leg member 262 and a V-shaped member 266. The straight leg member 262 and V-shaped member 266 are interconnected by a U-shaped member 264.

The V-shaped member 266 is adapted to engage mechanically and electrically the terminal of a battery terminal device, such as the terminal 216. The V-shaped member 266 is composed of a resilient member to enable it to be pressed into engagement with the terminal 216.

In use, the connector 210 is grasped and held in the hands of the user in such a manner to enable the electrodes attachment devices 212 and 213 to be secured removably to the body of the battery terminal device 218. In this regard, the adhesive strip 228 is positioned so that the electrode 222 engages terminal 216. The strip 228 is then attached removably to the device 218. Once the strip 228 is attached to the device 218, the user pressed downwardly on the top of the adhesive strip 228 in the direction of arrow B directly over the terminal 216, forcing the contact 234 into engagement with terminal 216. In a similar manner, device 212 is secured to the terminal device 218 so that the contact 232 engages the terminal 214 by pressing downwardly on top of electrode 220 in the direction of arrow A.

Figure 8:
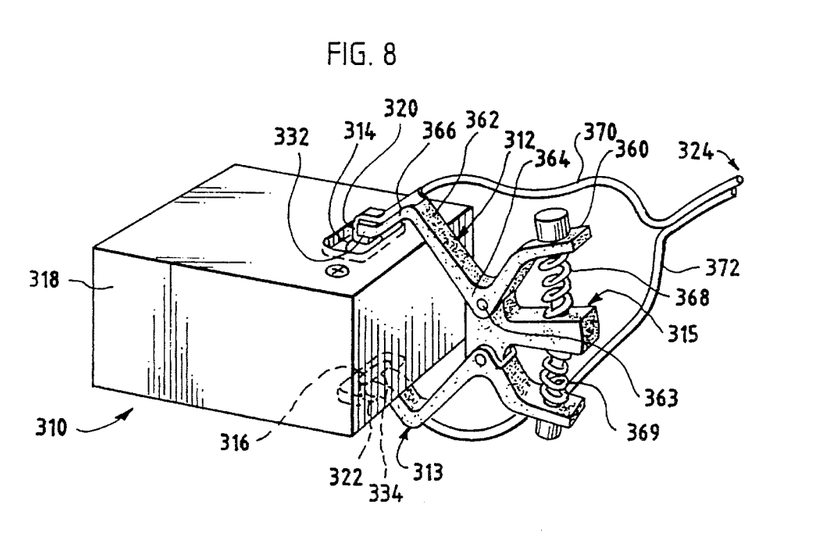
FIG. 8 is a pictorial view of a further universal adaptable battery charger connector, which is constructed in accordance with the present invention, and which is shown attached to a battery device to be charged.

Referring now to FIG. 8 of the drawings, there is shown another universally adaptable battery charger connector 310, which is adapted to be used with a battery charger unit (not shown). The connector 310 is similar to the connector 10 in that the connector 310 can be readily used for coupling a battery charger outlet to pairs of terminals of different types and kinds of rechargeable battery devices in accordance with the method of the present invention.

The connector 310 includes a pair of attachment devices 312 and 313 which are pivotally connected to a centrally disposed fulcrum member 315 for engaging releasably a pair of terminals, such as a pair of terminals 314 and 316. The attachment devices 312 and 313 include a pair of electrodes 320 and 322 respectively which are adapted to be coupled electrically to the battery charger outlet by a male jack 324. The male jack 324 is substantially similar to jack 24.

The electrodes 320 and 322 include a resilient contact, such as a contact 332 and 334 respectively for pressing resiliently into engagement with the pair of battery device terminals 314 and 316 respectively. The contacts 332 and 334 are substantially similar to contacts 32 and 34 respectively. Contacts 332 and 334 are connected to the jack 324 by a pair of conductors 370 and 372 respectively.

Considering now the construction of the connector 310 in greater detail with reference to FIG. 8, the attachment devices 312 and 313 are substantially similar so only device 312 will be described.

Referring now to FIG. 8, the attachment device 312 includes a finger engageable portion 360 having one end thereof integrally connected to a V-shaped portion 362. The V-shaped portion 362 has an apex portion 364 that is pivotally mounted to the fulcrum 315 by a pivot pin 363. The opposite end of the V-shaped portion 362 is connected to a straight leg portion 366, that is adapted to receive thereon the electrode 320. In this regard, the electrode 320 is mounted to the straight leg portion 366 in such a manner that contact 332 is disposed in proper orientation for engaging the terminal of a battery terminal device, such as the terminal 314 of the battery terminal device 318.

A pair of spring members 368 and 369 bias the attachment devices 312 and 313 together. In this regard, when a user depresses the finger engageable portion 360 toward the fulcrum member 315, the spring 368 is compressed allowing each of the straight leg portions to separate from one another. Thus, once the straight leg portions are spaced apart, the contact members 332 and 334 may be positioned to engage the terminals 314 and 316 respectively. When the contact members 332 and 334 are so positioned, the user releases the pressure on the straight leg members enabling the contacts 332 and 334 to engage the terminals 314 and 316 mechanically and electrically.

Figure 9:
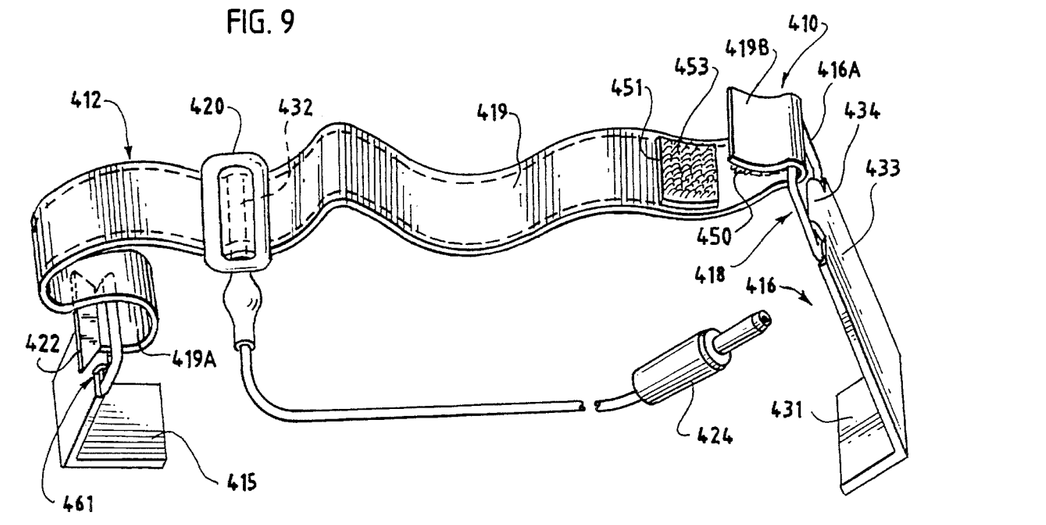
FIG. 9 is a pictorial, partially disassembled view of yet a further adaptable battery charger connector, which is constructed in accordance with the present invention.
Figure 10:
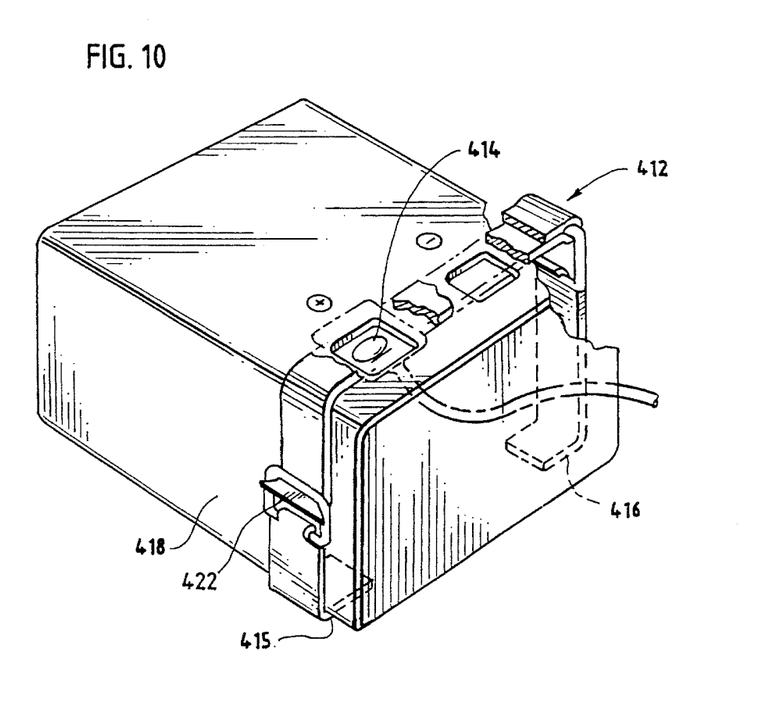
FIG. 10 is a pictorial view of a rechargeable battery device having the battery charger connector illustrated in FIG. 9 attached thereto for charging purposes.

Referring now to the drawings and more particularly to FIGS. 9 and 10 thereof, there is shown a universally adaptable battery charger connector 410, which is adapted to be used with a battery charger unit (not shown). The connector 410 is similar to the connector 10 in that conductor 410 can be readily used for coupling a battery charger outlet to the battery terminal of different types and kinds of rechargeable battery devices in accordance with the method of the present invention.

The connector 410 includes an attachment device 412 for engaging releasably the battery terminal 414 of a rechargeable battery terminal device, such as the battery terminal device 418. The attachment device 412 cooperates with a pair of L-shaped brackets 415 and 416 for helping to secure removably the device 412 to the battery terminal device 418 as will be explained hereinafter in greater detail.

Considering now the attachment device 412 in greater detail with reference to FIGS. 9 and 10, the device includes a single strap 419 having an electrode 420 mounted movable thereon, as well as another like electrode (not shown). The electrode 420 includes a resilient contact, such as a contact 432. The electrode 420 and contact 432 are substantially similar to electrode 20 and contact 32 and will not be described in greater detail. As best seen in FIG. 9, the electrode 420 is connected to a male jack 424 which is adapted to be coupled to the battery charger outlet.

The strap 419 is composed of a Velcro type material having a Velcro pile 450 on one side and a pad 451 of Velcro hooks 453 secured on the same side. In this regard, when the piles and hooks engage one another they secure the strap in a loop. From the foregoing it should be understood the strap 419 has a sufficient length to form a large number of different sized loop for accommodating a variety of different sized battery terminal devices as will be explained hereinafter.

The strap 419 is adapted to be attached removably to the brackets 415 and 416 respectively. In this regard, one free end of the strap 419 is adapted to be secured removably to bracket 415 by a retaining clip 422 mounted on a terminal end 419A of the strap 419. In this regard, a buckle cinch 415A mounted on the bracket 415 has an opening thereon indicated generally at 461. The opening 461 sufficiently large to permit an opposite free end 419B of the strap to pass therethrough but not sufficiently large to permit the retaining clip 422 to pass therethrough. Thus, the guard 415A secures the strap 419 removably to the bracket 415.

The strap 419 is also adapted to be secured removably to the bracket 416. In this regard, bracket 16 includes a buckle cinch 416A mounted thereto. The buckle cinch 416A has an opening 418 sufficiently large to allow the free end 419B to pass therethrough.

In use, the brackets 415 and 416 are positioned spaced apart and opposite one another and partially under the battery terminal device 418 as best seen in FIG. 9. The free end 419B of the strap 419 is then passed through the buckle cinch 415A and pulled until the retaining clip 422 engaging the cinch 415A. The free end 419A is then passed through the buckle cinch 416A and pulled a sufficient distance to cause the strap 419 rest loosely against the battery terminal 414. The user then adjusts the position the electrode 410 until the contact 432 engages the terminal 414. Once the contact 432 engages the terminal 414, the user holds the electrode 420 in place with one hand and pulls the free end 419B of the strap 419 with the other hand until the strap 419 firmly engages the battery terminal device 418. The Velcro hooks 453 and piles 450 are then engaged with one another securing the contact 432 to the battery terminal 424.

Considering now the brackets 415 and 416 in greater detail with reference to FIG. 9, the brackets 415 and 416 are substantially similar to one another so only bracket 416 will be described hereinafter.

Referring now to FIG. 9, bracket 416 is generally L shaped having a base leg member 431 and an upright leg member 433. The leg members 431 and 433 are joined at a right angle to one another to permit the bracket 416 to be placed partially under a battery terminal device, such as the battery terminal device 418.

The end of the upright leg member 433 opposite the base leg member 431 is secured to the buckle cinch 416A by a hinge 434 that permits the buckle cinch 416A to be extended over an adjustable range between an upright position parallel with the upright leg member 433 or at a right angle thereto parallel with the base leg member 431.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A universally adaptable battery charger connector for coupling electrically a battery charger outlet to at least one terminal disposed within a terminal well of any one of different types and kinds of rechargeable battery devices, comprising:

one-piece deformable contact means for engaging mechanically and electrically the terminal;

said deformable means including a stationary base electrode having a free end for coupling electrically to the battery charger outlet;

said deformable contact means further including a movable electrode cantilevered relative to the base electrode for moving toward and away from the base electrode to extend into the terminal well associated with the terminal and to engage the terminal mechanically and electrically;

said movable electrode having a free end to enable movement toward and away from said base electrode and being normally biased away from said base electrode and being deformable toward said base electrode when mechanically engaged with the terminal;

said movable electrode having a V-shaped portion disposed intermediate the ends of said movable electrode having an apex of sufficient height to enable the apex to enter said terminal well and to engage electrically the terminal;

said deformable contact means further including a reversely-bent U-shaped electrode integrally connected between an opposite end of said base electrode and an opposite end of said movable electrode for enabling said V-shaped portion to move towards and away from the base electrode;

attachment means connected mechanically to said deformable means to facilitate mechanical engagement between the terminal and said V-shaped portion for helping to supply electrical current to the battery device terminal; and securing means for mounting removably on the battery device to be charged to help maintain mechanical contact between the terminal and said contact means;

whereby, the contact means can be positioned relative to the terminal independent of the size and shape of the battery device and of the configuration of the terminal.

2. A universally adaptable battery charger connector for coupling electrically a battery charger outlet to at least one terminal pair of any one of different types and kinds of rechargeable battery devices, comprising:

attachment means for engaging releasably one of the pairs of battery device terminals;

said attachment means including a pair of electrodes coupled electrically to the battery charger outlet for contacting electrically the pair of terminals to help supply electrical current to the battery device terminals;

securing means for mounting removably on the battery device to be charged, each one of said electrodes including resilient contact means for pressing resiliently into engagement with the terminals to maintain electrical and mechanical contact between said securing means and terminals so that the electrodes can be positioned in engagement with the terminals independent of the size and shape of the battery device and of the configuration of the terminals;

wherein said attachment means is a strap; and wherein said strap means includes a strap having a pair of slide plates mounted thereon for movement relative to one another.

3. A universally adaptable battery charger connector for coupling electrically a battery charger outlet to at least one terminal pair of any one of different types and kinds of rechargeable battery devices, comprising:

electrode means for engaging releasably one of the pairs of battery device terminals;

said electrode means including a pair of electrodes coupled electrically to the battery charger outlet for contacting electrically the pair of terminals to help supply electrical current to the battery device terminals, each one of said electrodes including a resilient contact for pressing resiliently into engagement with the terminals to facilitate electrical and mechanical engagement therebetween;

securing means connected mechanically to said electrode means for mounting removably on the battery device to be charged so that the electrodes can be positioned in engagement with the terminals independent of the size and shape of the battery device and of the configuration of the terminals; and wherein said securing means is suction cup means.

4. A universally adaptable battery charger connector for coupling electrically a battery charger outlet to at least one terminal pair of different types and kinds of rechargeable battery devices according to claim 1, wherein said securing means is strap means;

wherein said strap means includes means for engaging releasably the rechargeable battery device;

wherein said strap means is elastic means;

wherein said elastic means is a rubber band; and wherein said means for engaging is bracket means.

5. A universally adaptable battery charger connector for coupling electrically a battery charger outlet to a terminal pair of any one of different types and kinds of rechargeable battery devices, comprising:

deformable contact means for engaging releasably one of the pairs of battery device terminals;

said contact means each including a pair of electrode means coupled electrically to the battery charger outlet for contacting electrically each one of the pair of terminals to help supply electrical current to each one of the battery device terminals, each one of said electrode means including a resiliently movable electrode for pressing resiliently into engagement with one of the terminals to facilitate electrical and mechanical engagement therebetween;

securing means for mounting removably on the battery device to be charged so that said electrode means can be positioned in engagement with one of the terminals independent of the size and shape of the battery device and of the configuration of each one of the terminals;

wherein said securing means is a strap having buckle means for helping to fasten said securing means removably on the battery device to be charged.

6. A universally adaptable battery charger connector for coupling electrically a battery charger outlet to at least one terminal disposed within a terminal well of any one of different types and kinds of rechargeable battery devices, comprising:

one-piece deformable contact means for engaging mechanically and electrically the terminal;

said deformable means including a stationary base electrode having a free end for coupling electrically to the battery charger outlet;

said deformable contact means further including a movable electrode cantilevered relative to the base electrode for moving toward and away from the base electrode to extend into the terminal well associated with the terminal and to engage the terminal mechanically and electrically;

said movable electrode having a free end to enable movement toward and away from said base electrode and being normally biased away from said base electrode and being deformable toward said base electrode when mechanically engaged with the terminal;

said movable electrode having a V-shaped portion disposed intermediate the ends of said movable electrode having an apex of sufficient height to enable the apex to enter said terminal well and to engage electrically the terminal;

said deformable contact means further including a reversely-bent U-shaped electrode integrally connected between an opposite end of said base electrode and an opposite end of said movable electrode for enabling said V-shaped portion to move towards and away from the base electrode;

attachment means connected mechanically to said deformable means to facilitate mechanical engagement between the terminal and said V-shaped portion for helping to supply electrical current to the battery device terminal;

securing means for mounting removably on the battery device to be charged to help maintain mechanical contact between the terminal and said contact means;

whereby, the contact means can be positioned relative to the terminal independent of the size and shape of the battery device and of the configuration of the terminal; and wherein said attachment means is a strap.

7. A universally adaptable battery charger connector for coupling electrically a battery charger outlet to at least one terminal disposed within a terminal well of any one of different types and kinds of rechargeable battery devices, comprising:

one-piece deformable contact means for engaging mechanically and electrically the terminal;

said deformable means including a stationary base electrode having a free end for coupling electrically to the battery charger outlet;

said deformable contact means further including a movable electrode cantilevered relative to the base electrode for moving toward and away from the base electrode to extend into the terminal well associated with the terminal and to engage the terminal mechanically and electrically;

said movable electrode having a free end to enable movement toward and away from said base electrode and being normally biased away from said base electrode and being deformable toward said base electrode when mechanically engaged with the terminal;

said movable electrode having a V-shaped portion disposed intermediate the ends of said movable electrode having an apex of sufficient height to enable the apex to enter said terminal well and to engage electrically the terminal;

said deformable contact means further including a reversely-bent U-shaped electrode integrally connected between an opposite end of said base electrode and an opposite end of said movable electrode for enabling said V-shaped portion to move towards and away from the base electrode;

attachment means connected mechanically to said deformable means to facilitate mechanical engagement between the terminal and said V-shaped portion for helping to supply electrical current to the battery device terminal;

securing means for mounting removably on the battery device to be charged to help maintain mechanical contact between the terminal and said contact means;

whereby, the contact means can be positioned relative to the terminal independent of the size and shape of the battery device and of the configuration of the terminal; and wherein said attachment means is an adhesive band.

8. A universally adaptable battery charger connector for coupling electrically a battery charger outlet to at least one terminal disposed within a terminal well of different types and kinds of rechargeable battery devices, comprising:

deformable electrode means coupled electrically to the battery charger outlet for contacting electrically at least one of the battery device terminals to help supply electrical current thereto;

said deformable electrode means including an elongated electrode portion having a free end for coupling electrically to the battery charger outlet; and said deformable contact means further including a movable electrode connected integrally to an opposite end of said elongated electrode portion for moving toward and away from the free end of said elongated electrode to enter the terminal well associated with the terminal and to engage the terminal;

said movable electrode having a free end and being normally biased away from the elongated electrode and having a free end engageable with a portion of the elongated electrode when deformed toward said elongated electrode through mechanical engagement with the terminal;

said movable electrode having a V-shaped portion having an apex of sufficient height to enable the apex to enter said terminal well and to engage the terminal electrically;

adjustment means for helping to position said deformable electrode means relative to the rechargeable battery device terminal so that said V-shaped portion engages the terminal resiliently to maintain electrical and mechanical contact therebetween;

whereby the deformable electrode means can be positioned in engagement with the terminal independent of the size and shape of the battery device and the external accessible location of the terminal; and wherein said adjustment means is strap means.

9. A universally adaptable battery charger connector as recited in claim 2 wherein each of said slide plates are electrically and mechanically connected to one of said pair of electrodes.

10. A universally adaptable battery charger connector as recited in claim 9, wherein one side of said strap contains piles.

11. A universally adaptable battery charger connector as recited in claim 10, wherein the one side of said strap includes a strip of hooks for engagement with said piles.

12. A universally adaptable battery charger connector as recited in claim 1, wherein said attachment means is a clamp.

13. In combination with a battery charger system, a universally adaptable battery charger connector, said connector being adapted to be coupled electrically between the outlet of a battery charger and at least one terminal disposed within a terminal well of any one of different types and kinds of rechargeable battery devices, the connector comprising:

deformable contact means for engaging mechanically and electrically the terminal;

said deformable means including an elongated electrode portion having a free end for coupling electrically to the battery charger outlet;

said deformable contact means further including a movable electrode connected integrally to an opposite end of said elongated electrode portion for moving toward and away from the elongated electrode to enter the terminal well associated with the terminal and to engage the terminal;

said movable electrode being normally biased away from the elongated electrode and having a free end engageable with a portion of the elongated electrode when deformed toward said elongated electrode through mechanical engagement with the terminal;

said movable electrode having a V-shaped portion having an apex of sufficient height to enable the apex to enter said terminal well and to engage electrically the terminal;

attachment means connected mechanically to said deformable means to facilitate mechanical engagement between the terminal and said movable electrode for helping to supply electrical current to the battery device terminal; and securing means for mounting removably on the battery device to be charged to help maintain mechanical contact between the terminal and said movable electrode;

whereby, the contact means can be positioned relative to the terminal independent of the size and shape of the battery device and of the configuration of the terminal.

14. A method of using a universally adaptable battery charger connector for coupling electrically a battery charger outlet to at least one battery device terminal disposed within a terminal well of any one of different types and kinds of rechargeable battery devices, comprising:

engaging mechanically and electrically the terminal with deformable contact means;

said deformable means including elongated electrode means having a free end for coupling electrically to the battery charger outlet;

said deformable contact means further including movable electrode means connected integrally to an opposite end of said elongated electrode means for moving toward and away from the free end of said elongated electrode means to enter the terminal well and to engage the battery device terminal;

said movable electrode means having a free end and being normally biased away from the elongated electrode means and engageable with a portion of the elongated electrode means when said free end is deformed toward said elongated electrode means through mechanical engagement with the terminal;

said movable electrode means having a V-shaped portion having an apex of sufficient height to enable the apex to enter the terminal well and to engage electrically the battery device terminal;

using attachment means connected mechanically to said deformable means to facilitate mechanical engagement between the terminal and said movable electrode means for helping to supply electrical current to the battery device terminal; and mounting removably on the battery device to be charged securing means to help maintain mechanical contact between the terminal and said movable electrode means;

whereby the contact means can be positioned relative to the terminal independent of the size and shape of the battery device and of the configuration of the terminal.

15. A universally adaptable battery charger connector for coupling electrically a battery charger outlet to at least one terminal disposed within a terminal well of different types and kinds of rechargeable battery devices, comprising:

deformable electrode means coupled electrically to the battery charger outlet for contacting electrically at least one of the battery device terminals to help supply electrical current thereto;

said deformable electrode means including an elongated electrode portion having a free end for coupling electrically to the battery charger outlet; and said deformable contact means further including a movable electrode connected integrally to an opposite end of said elongated electrode portion for moving toward and away from the free end of said elongated electrode to enter the terminal well associated with the terminal and to engage the terminal;

said movable electrode having a free end and being normally biased away from the elongated electrode and having a free end engageable with a portion of the elongated electrode when deformed toward said elongated electrode through mechanical engagement with the terminal;

said movable electrode having a V-shaped portion having an apex of sufficient height to enable the apex to enter said terminal well and to engage the terminal electrically;

adjustment means for helping to position said deformable electrode means relative to the rechargeable battery device terminal so that said V-shaped portion engages the terminal resiliently to maintain electrical and mechanical contact therebetween;

whereby the deformable electrode means can be positioned in engagement with the terminal independent of the size and shape of the battery device and the external accessible location of the terminal.

16. A universally adaptable battery charger connector as recited in claim 8, wherein said strap means includes means for engaging releasably the rechargeable battery device.

17. A universally adaptable battery charger connector as recited in claim 16, wherein said strap means is elastic means.

18. A universally adaptable battery charger connector as recited in claim 17, wherein said elastic means is a rubber band.

* * * * *